(12) United States Patent
Yanagida et al.

(10) Patent No.: US 7,315,234 B2
(45) Date of Patent: Jan. 1, 2008

(54) LOAD CONTROL APPARATUS AND LOAD CONTROL SYSTEM

(75) Inventors: Yo Yanagida, Shizuoka-ken (JP); Terumitsu Sugimoto, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 127 days.

(21) Appl. No.: 11/390,446

(22) Filed: Mar. 28, 2006

(65) Prior Publication Data

US 2006/0220800 A1 Oct. 5, 2006

(30) Foreign Application Priority Data

Mar. 31, 2005 (JP) ............................ P2005-103905

(51) Int. Cl.
*G05B 11/01* (2006.01)

(52) U.S. Cl. .................. 340/310.15; 340/537; 340/538

(58) Field of Classification Search ........... 340/310.15, 340/310.11, 310.17, 538, 537, 538.14; 307/10.1, 307/31, 98, 140; 701/1, 36; 323/208, 209, 323/352, 364; 375/269; 361/62
See application file for complete search history.

(56) References Cited

U.S. PATENT DOCUMENTS 6,229,432 B1* 5/2001 Fridley et al. .......... 340/310.14

2004/0223275 A1* 11/2004 Yanagida et al. ............. 361/62
2006/0224278 A1* 10/2006 Yanagida et al. .............. 701/1
2007/0013492 A1* 1/2007 Yanagida et al. ...... 340/310.17

FOREIGN PATENT DOCUMENTS

JP 2004-120740 4/2004

* cited by examiner

*Primary Examiner*—Toan N. Pham
(74) *Attorney, Agent, or Firm*—Finnegan, Henderson, Farabow, Garrett & Dunner, L.L.P.

(57) ABSTRACT

A load control apparatus is connected to a master station through a power line supplied with direct-current power. The load control apparatus is driven by the direct-current power supplied from the power line to communicate with the master station through the power line. The load control apparatus includes a PLC part, first and second branch lines, connected to the power line, an impedance element connected to only the second branch line, a motor connected to only the first branch line, a condenser connected in parallel with the motor, the condenser having a capacitance resonating with an inductance component of the motor and frequency of the communication signal, a control part configured to perform a variety of processes, based on the communication signal received by the communication part communicating with the master station, and a circuit power part connected to the second branch line through the impedance element and configured to supply the PLC part and the control part with the desired power.

10 Claims, 4 Drawing Sheets

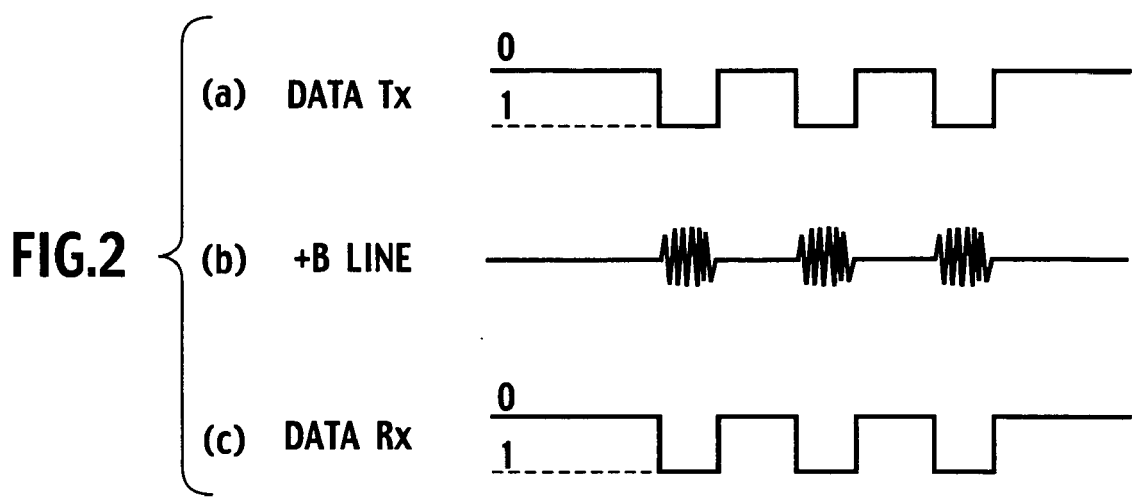
FIG.4A
FIG.4B
FIG.4C
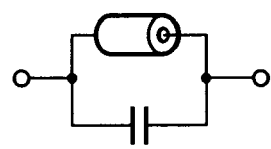
FIG.4D
FIG.4E

LOAD CONTROL APPARATUS AND LOAD CONTROL SYSTEM

BACKGROUND OF THE INVENTION

1. Field of the Invention

The present invention relates to a load control apparatus and system for performing data communication adopting power line communication (PLC) method.

2. Description of Related Art

Japanese Patent Publication laid-open No. 2004-120740 discloses a load control system mounted on a vehicle to perform data communication with the use of amplitude shift keying (ASK) method and PLC method. In the ASK method, either value "0" or value "1" is expressed dependently of largeness/smallness in amplitude of a communication signal. While, according to the PLC method, communication is effected through power lines for electric power. In detail, communication signals and drive powers are superimposed on the power lines. FIG. 1 shows a load control system 100 in the conventional art.

The load control system 100 comprises a master station 200, a slave station 300, a power line (i.e. +B line) 400 and a ground line 500. The power line 400 is supplied with direct-current electricity affording a driving electric power. The master station 200 includes a control part 201, a PLC part 202, a branch line 203, an impedance element 204 and a circuit power part 205. While, the slave station 300 includes a PLC part 301, a branch line 302, an impedance element 303, a circuit power part 304, relays 305a~305d, a motor 306, a control part 307 and a condenser 308. In the load control system 100 constructed above, the master station 200 and the slave station 300 are communicated with each other by means of communication signals, allowing a driving of the motor 306.

By combining signals representing value "0" (each referred to as "0-signal" after) with signals representing value "1" (each referred to as "1-signal" after), the control part 201 produces a master signal relating to an operation content of the motor 306 and further outputs the master signal to the PLC part 202.

The PLC part 202 produces a high frequency signal having predetermined frequency and amplitude (i.e. carrier signal). For the 0-signal forming the master signal, the PLC part 202 makes amplitude of the carrier signal less than a predetermined reference value. While, for the signal "1" forming the master signal, the PLC part 202 makes amplitude of the carrier signal more than the predetermined reference value (i.e. ASK modulation of the master signal). In this way, the PLC part 202 converts the master signal to a communication signal and further outputs it to the power line 400. Additionally, the PLC part 202 also receives a communication signal supplied from the slave station 300 through the power line 400. On receipt of the communication signal, the PLC part 202 converts a signal having its magnitude larger than a reference value to the signal "1" and also converts a signal having its magnitude smaller than the reference value to the signal "0" (i.e. ASK modulation of the communication signal). In other words, the PLC part 200 converts the communication signals to slave signal and outputs it to the control part 201. Note that the slave signal is one produced by the control part 307, representing a completion of the operation of the motor 306 or the like.

The branch line 203 is connected to the power line 400, while the circuit power part 205 is connected to the branch line 203 through the impedance element 204. The circuit power part 205 produces desired electric power from direct-current electricity supplied through the branch line 203 and supplies the electric power to the control part 201 and the PLC part 202. The control part 201 and the PLC part 202 are driven by the electric power supplied from the circuit power part 205.

The PLC part 301 receives a communication signal through the power line 400, converts the communication signal to a master signal by ASK demodulation and outputs the master signal to the control part 307. While, the PLC part 301 also converts a slave signal supplied from the control part 307 to a communication signal by ASK demodulation and outputs the communication signal to the power line 400. In FIG. 2, (a) shows the master signal (i.e. data Tx) produced by the control part 201, (b) shows the communication signal corresponding to the master signal and (c) shows the master signal (i.e. data Rx) produced by the PLC part 301 demodulating the communication signal.

In the slave station 300, the branch line 302 is connected to the power line 400, while the circuit power part 304 is connected to the branch line 302 through the impedance element 303. The circuit power part 304 produces desired electric power from direct-current electricity supplied through the branch line 302 and supplies the electric power to the control part 307 and the PLC part 301. The control part 307 and the PLC part 301 are driven by the electric power supplied from the circuit power part 304.

The relays 305a, 305b have their one ends connected to the branch line 302 through the impedance element 303. The other end of the relay 305a is connected to one end of the relay 305c and one end (terminal) of the motor 306. The other end of the relay 305b is connected to one end of the relay 305d and the other end (terminal) of the motor 306. The other ends of the relays 305c, 305d are connected to the ground line 500.

The motor 306 is driven in rotation by direct-current electricity flowing in the power line 400. In detail, when the relays 305a, 305d are activated (ON), the direct-current electricity flows from the one end (terminal) of the motor 306 to the other end (terminal). When the relays 305b, 305c are activated (ON), the direct-current electricity flows from the other end (terminal) of the motor 306 to the other end (terminal). Therefore, a rotating direction of the motor 306 when the relays 305a, 305d are activated (ON) is opposite to a rotating direction of the motor 306 when the relays 305b, 305c are activated (ON). For example, such rotations of the motor 306 are utilized to drive a powered window (not shown).

The control part 307 controls the operation of the motor 306, based on the master signal supplied from the PLC part 301. In detail, the control part 307 activates either one pair of the relays 305a, 305d or another pair of the relays 305b, 305c to rotate the motor 306 and inactivates all of the relays 305a, 305b, 305c, 305d to stop a rotation of the motor 306. The control part 307 produces the slave signal representing a completion of the operation of the motor 306 or the like and outputs the slave signal to the PLC part 301.

The condenser 308 has one end connected to the branch line 302 through the impedance element 303 and the other end connected to the ground line 500. The condenser 308 introduces noise contained in the direct-current electricity into the ground line 500 to remove the noise from the direct-current electricity.

We now describe the reason why the circuit power parts 205, 304 and the motor 306 are connected to the branch lines 203, 302 through the impedance elements 204, 303, respectively. In the load control system 100, it is necessary to supply the circuit power parts 205, 304 and the motor 306 with the direct-current electricity flowing in the power line 400. In the load control system 100, therefore, the branch lines 203, 302 are connected to the power line 400, while the circuit power parts 205, 304 and the motor 306 are connected to the branch lines 203, 302 respectively, whereby the direct-current electricity flowing in the power line 400 can be supplied to the circuit power parts 205, 304 and the motor 306.

However, it is noted that the above structure causes the communication signal to flow in the branch lines 203, 302 also. Thus, unless impedances from the branch lines 203, 302 up to the circuit power parts 205, 304 and the motor 306 are ensured, the communication signal in case of a current signal would be easy to flow in the branch lines 203, 302, so that amplitude of the communication signal flowing in the branch lines 203, 302 get larger. For a high-frequency component such as the communication signal, the condenser 308 connected to the power line 400 can be regarded as a conducting wire (i.e. one kind of short circuit). Although it is not shown in the figure, a condenser similar to the condenser 308 is connected to the branch line 203. Accordingly, in case of the communication signal of a voltage signal, a potential of the power line 400 (in detail, potential related to a high-frequency component and corresponding to amplitude of the communication signal flowing in the power line 400) would fall unless impedances from the branch lines 203, 302 up to the circuit power parts 205, 304 and the motor 306 are ensured. In detail, the potential of the power line 400 would fall close to a ground potential. Thus, if impedances from the branch lines 203, 302 up to the circuit power parts 205, 304 and the motor 306 are not ensured, there is a possibility that the amplitude of the communication signal for the PLC parts 202, 301 get smaller so as to damage accuracy of communication.

From the reason mentioned above, the circuit power part 205 is connected to the branch line 203 through the impedance element 204, while the circuit power part 205 and the motor 306 are connected to the branch line 302 through the impedance element 303. Consequently, the impedances from the branch lines 203, 302 up to the circuit power parts 205, 304 are ensured.

However, as the impedance element 303 is supplied with not only direct-current electricity for the circuit power part 304 but also direct-current electricity for the motor 306, the same element 303 is required to cope with such great current. From this point of view, the impedance element 303 is large-sized and therefore, the load control system 100 is also large-sized, causing both weight and manufacturing cost of the system 100 to be increased.

SUMMARY OF THE INVENTION

Under the circumstances, it is therefore an object of the present invention to provide load control apparatus and system both of which can ensure impedance of a slave station from a branch line up to a circuit power part and a load and further miniaturize an impedance element in comparison with the conventional apparatus and system.

The object of the present invention described above can be accomplished by a load control apparatus connected to a master station through a power line supplied with direct current power and driven by the direct current power supplied from the power line to communicate with the master station through the power line, the load control apparatus comprising: a communication part connected to the power line to communicate with the master station with use of a communication signal having predetermined frequency; first and second branch lines connected to the power line; an impedance element connected to only the second branch line; a load connected to only the first branch line and driven by the direct current power supplied through the first branch line; a capacitance element connected in parallel with the load, the capacitance element having a capacitance resonating with an inductance component of the load and the frequency of the communication signal; a control part configured to perform a variety of processes, based on the communication signal received by the communication part communicating with the master station; and a circuit power part connected to the second branch line through the impedance element and configured to produce desired power from the direct current power supplied through the second branch line and configured to supply the communication part and the control part with the desired power.

According to the present invention, there is also provided a load control system having a master station and a slave station connected to the master station through a power line to which direct current power is supplied, the master station and the slave station being driven by the direct current power supplied through the power line and communicating with each other through the power line, wherein the slave station comprising: a communication part connected to the power line to communicate with the master station with use of a communication signal having predetermined frequency; first and second branch lines connected to the power line; an impedance element connected to only the second branch line; a load connected to only the first branch line and driven by part of the direct current power supplied through the first branch line; a capacitance element connected in parallel with the load, the capacitance element having a capacitance resonating with an inductance component of the load and the frequency of the communication signal; a control part configured to perform a variety of processes, based on the communication signal received by the communication part communicating with the master station; and a circuit power part connected to the second branch line through the impedance element and configured to produce desired power from the direct current power supplied through the second branch line and configured to supply the communication part and the control part with the desired power.

In the present invention, a parallel resonant circuit is formed by the inductance component of the load and the capacitance element, resonating with the frequency of the communication signal. Since the impedance of the parallel resonant circuit has a maximum at the frequency of the communication signal, a reduction in the magnitude of the communication signal due to the first branch line is minimized. Further, the impedance element is connected to the second branch line. Accordingly, the impedance from the first and second branch lines up to the circuit power part and the load is ensured.

Additionally, the impedance element is connected to only the second branch line, while the load is connected to only the first branch line. Therefore, the impedance element is supplied with part of direct current power flowing in the power line, the part being provided to the circuit power part. Therefore, since the impedance element has only to cope with small current, the impedance element can be small-sized in comparison with the conventional impedance element. Consequently, it is possible to miniaturize the load control system while reducing both its weight and manufacturing cost.

These and other objects and features of the present invention will become more fully apparent from the following description and appended claims taken in conjunction with the accompany drawings.

BRIEF DESCRIPTION OF THE DRAWINGS

FIG. 2 is a timing chart showing a communication form in accordance with ASK method;

FIGS. 4A to 4E are circuit diagrams showing a concrete example of an impedance element;

DESCRIPTION OF THE PREFERRED EMBODIMENT

Figure 1:
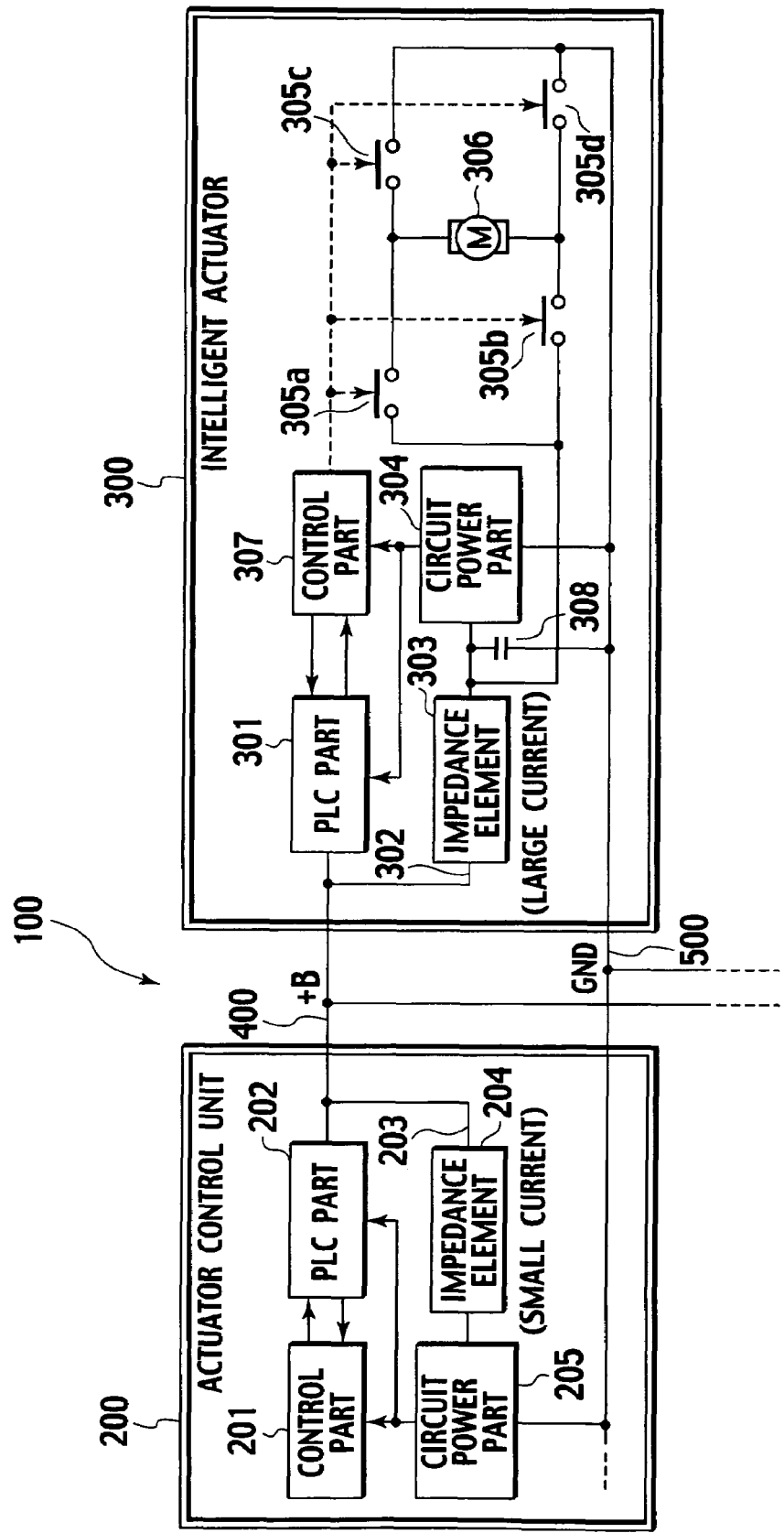
FIG. 1 is a block diagram showing a constitution of a conventional load control system.
Figure 3:
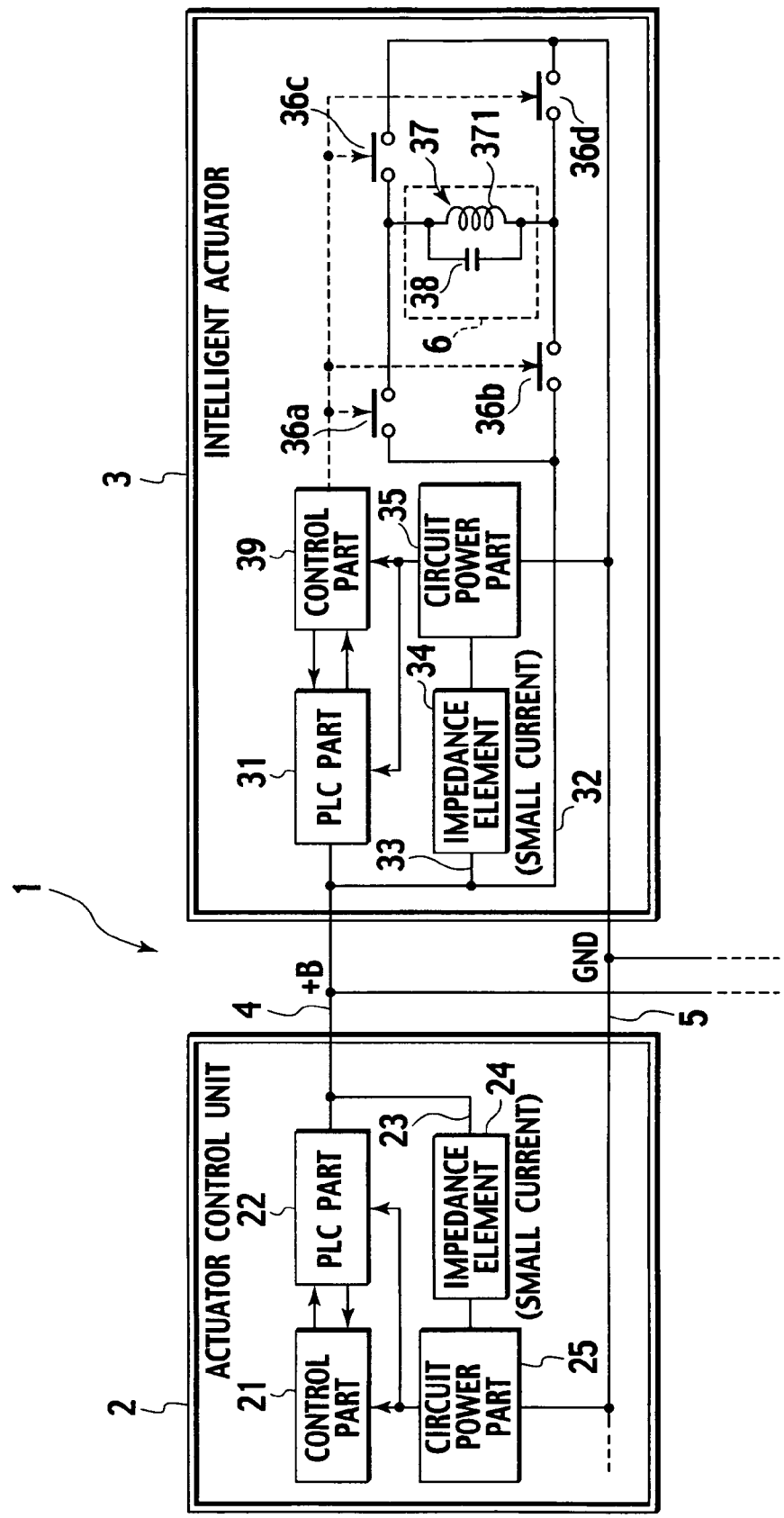
FIG. 3 is a block diagram showing a constitution of a load control system in accordance with one embodiment of the present invention.

An embodiment of the present invention will be described with reference to the drawings. FIG. 3 is a block diagram showing a constitution of a load control system 1 in accordance with one embodiment of the present invention. The load control system 1 comprises a master station 2 mounted on a vehicle (not shown), a slave station 3, a power line [i.e. a positive wire (+B) of a battery] 4 and a ground line 5. The power line 4 is supplied with direct-current electricity (or direct current power) affording a driving electric power. The master station 2 includes a control part 21, a PLC part 22, a branch line 23, an impedance element 24 and a circuit power part 25. While, the slave station 3 includes a PLC part 31, branch lines 32, 33, an impedance element 34, a circuit power part 35, relays 36a~36d, a motor 37, a condenser 38 and a control part 39. In the above-constructed load control system 1, the master station 2 and the slave station 3 are communicated with each other by means of communication signals, so that the motor 37 is driven in rotation. In this embodiment, the master station 2 constitutes an actuator control unit, while the slave station 3 constitutes an intelligent actuator having the motor 37 built-in. Note that although reference numeral 371 indicates a coil in FIG. 3, this coil 371 represents an equivalent circuit of the motor 37.

By combining signals of "0" with signals of "1", the control part 21 produces a master signal relating to operational contents of the motor 37 and further outputs the master signal to the PLC part 22.

The PLC part 22 convert the master signal to a communication signal with application of ASK (amplitude shift keying) modulation. The resultant communication signal is generated from the PLC part 22 to the power line 4. The PLC part 22 also receives a communication signal supplied from the slave station 3 through the power line 4, converts the communication signal to a slave signal with application of ASK (amplitude shift keying) demodulation and outputs the slave signal to the control part 21. Note that this slave signal is one produced by the control part 39 previously and representing a completion of the operation of the motor 37 or the like.

The branch line 23 is connected to the power line 4, while the circuit power part 25 is connected to the branch line 23 through the impedance element 24. The circuit power part 25 produces desired electric power from direct-current electricity supplied through the branch line 23 and supplies the electric power to the control part 21 and the PLC part 22. The control part 21 and the PLC part 22 are driven by the electric power supplied from the circuit power part 25.

The PLC part 31 receives a communication signal (i.e. signal supplied from the master station 2) through the power line 4, converts the communication signal to a master signal by ASK modulation and outputs the master signal to the control part 39. Additionally, the PLC part 31 also converts a slave signal supplied from the control part 39 to a communication signal by ASK demodulation and outputs the communication signal to the power line 4.

The branch lines 32, 33 are connected to the power line 4, while the impedance element 34 is connected to only the branch line (i.e. the second branch line) 33.

The circuit power part 35 is connected to the branch line 33 through the impedance element 34. The circuit power part 35 produces desired electric power from direct-current electricity supplied through the branch line 33 and supplies the electric power to the control part 39 and the PLC part 31. The control part 39 and the PLC part 31 are driven by the electric power supplied from the circuit power part 35.

FIGS. 4A to 4E show concrete examples of the impedance element 34. For example, the impedance element 34 is formed by a coil of FIG. 4A, a ferrite bead of FIG. 4B, a resistance of FIG. 4C, a parallel circuit having a ferrite bead and a condenser of FIG. 4D, a series circuit having a resistance and a coil of FIG. 4E or a not-shown circuit as a result of combining these elements.

The relays 36a, 36b have their one ends connected to the branch line (i.e. the first branch line) 32. The other end of the relay 36a is connected to one end of the relay 36c and one end (terminal) of the motor 37. The other end of the relay 36b is connected to one end of the relay 36d and the other end (terminal) of the motor 37. The other ends of the relays 36c, 36d are connected to the ground line 5.

The motor 37 is connected to only the branch line 32 and driven in rotation by direct-current electricity flowing in the power line 4. In detail, when the relays 36a, 36d are activated (ON), the direct current flowing in the power line 4 flows from the one end (terminal) of the motor 37 to the other end (terminal). When the relays 36b, 36c are activated (ON), the direct-current electricity flowing in the power line 4 flows from the other end (terminal) of the motor 37 to the other end (terminal). Therefore, a rotating direction of the motor 37 when the relays 36a, 36d are activated (ON) is opposite to a rotating direction of the motor 37 when the relays 36b, 36c are activated (ON). For example, such rotations of the motor 37 are utilized to drive a powered window (not shown). Now, the rotating direction of the motor 37 when the relays 36a, 36d are activated (ON) is defined as "forward direction", while the rotating direction of the motor 37 when the relays 36b, 36c are activated (ON) is defined as "backward direction".

The condenser 38 is connected in parallel with the motor 37. The condenser 38 has a capacitance resonating with an inductance component of the motor 37 and frequency of the communication signal. That is, representing capacitance of the condenser 37, self-inductance of the coil 371 and the frequency of the communication signal by C, L and f, respectively, there is established, among these parameters, a relationship shown with the following expression (1).

$$f = 1/\{2 \times \pi \times (L \times C)^{(1/2)}\} \quad (1)$$

Accordingly, since the impedance of a parallel resonant circuit 6 consisting of the inductance component of the motor 37 and the condenser 38 has a maximum value at the frequency of the communication signal, an increase in the magnitude of the communication signal due to the branch line 32 is minimized.

Figure 5:
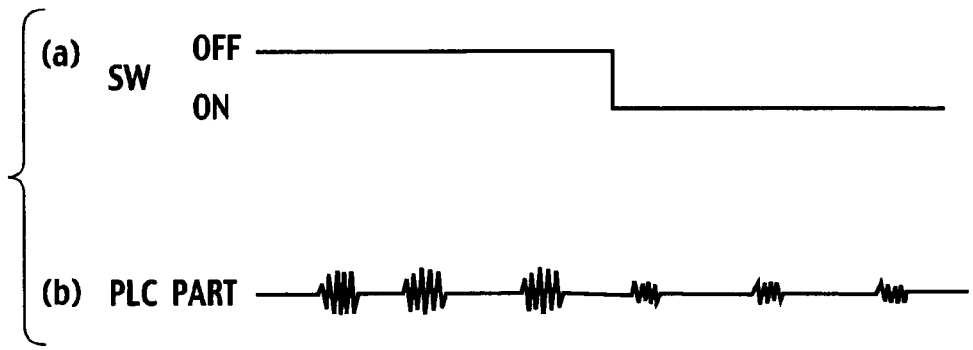
FIG. 5 is a timing chart showing a situation where amplitude of a communication signal received by a PLC part varies when a capacity of a condenser does not resonate with frequency of the communication signal.
Figure 6:
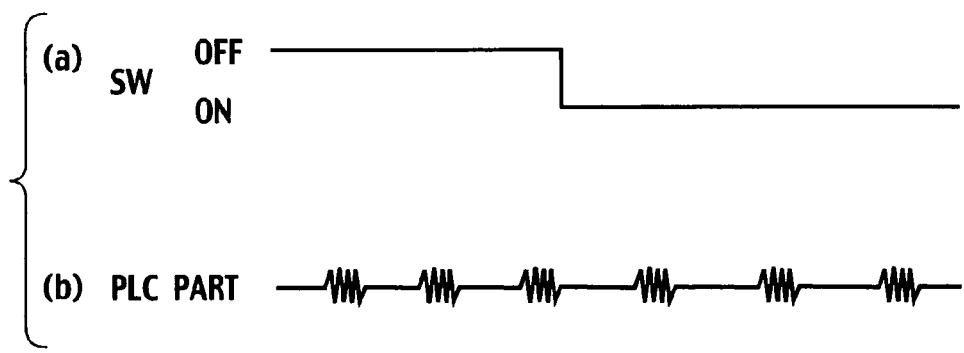
FIG. 6 is a timing chart showing a situation where the amplitude of the communication signal received by the PLC part varies when the capacity of the condenser resonates with the frequency of the communication signal.

FIG. 5 shows a situation where the magnitude of the communication signal received by the PLC parts 22, 31 changes when the capacitance of the condenser 38 does not resonate with the frequency of the communication signal. FIG. 6 shows a situation where the magnitude of the communication signal received by the PLC parts 22, 31 changes when the capacitance of the condenser 38 resonates with the frequency of the communication signal. In the figures, "SW-ON" designates the motor 37 in rotation, while "SW-OFF" designates the motor 37 at standstill. As either the relays 36a, 36b in pairs or the relays 36b, 36c in pairs are activated at rotation of the motor 37, the branch line 32 is electrically connected to the ground line 5. In other words, the communication signal flows in the branch line 32.

As shown in FIGS. 5 and 6, when the capacitance of the condenser 38 resonates with the frequency of the communication signal, the magnitude of the communication signal that each of the PLC parts 22, 31 receives during rotating of the motor is larger than that in case that the capacitance of the condenser 38 does not resonate with the frequency of the communication signal. Because the impedance of the parallel resonant circuit 6 has a maximum value at the frequency of the communication signal.

In the load control system 1 of this embodiment, therefore, the parallel resonant circuit 6 and the impedance element 34 are together connected to the branch line 32, so that the impedance from the branch lines 32, 33 up to the circuit power part 35 and the motor 37 can be ensured.

The control part 39 controls the operation of the motor 37, based on the master signal supplied from the PLC part 31. In detail, the control part 39 activates either the relays 36a, 36 in pairs or the relays 36b, 36c in pairs to rotate the motor 37 and inactivates all of the relays 36a, 36b, 36c and 36d to stop a rotation of the motor 37. The control part 39 produces the slave signal representing a completion of the operation of the motor 37 or the like and outputs the slave signal to the PLC part 31.

The operation of the load control system 1 will be described by one example that the motor 37 starts to rotate in the forward direction.

When the power line 4 is supplied with direct-current electricity, it is supplied to the circuit contort parts 25, 35 through the impedance elements 24, 34, respectively. Then, the circuit control part 25 produces desired electric power from the direct-current electricity and further supplies the control part 21 and the PLC part 22 with the produced electric power. Similarly, the circuit control part 35 produces desired electric power from the direct-current electricity and further supplies the control part 39 and the PLC part 31 with the produced electric power. In this way, the control parts 21, 39 and the PLC parts 22, 31 are driven together.

The control part 21 combines the 0-signals with the 1-signals to produce a master signal allowing the motor 37 to start its rotation in the forward direction and outputs the master signal to the PLC part 22. Then, the PLC part 22 converts the master signal to a communication signal in accordance with ASK modulation and further outputs the communication signal to the power line 4. At this moment, the branch line 32 and the ground line 5 are disconnected from each other, so that the communication signal flows in not only the power line 4 but also the branch lines 23, 33.

Nevertheless, owing to the provision of the impedance elements 24, 34, the amplitude of the communication signal that the PLC part 31 receives gets large in comparison with amplitude of a communication signal that the PLC part 31 would receive if the impedance elements 24, 34 are not provided. That is, despite of flowing of the communication signal in the branch lines 23, 33, there is no possibility that the accuracy of communication is damaged.

Receiving the communication signal provided from the power line 4, the PLC part 31 converts the communication signal to a master signal by ASK demodulation and further outputs the master signal to the control part 39.

Then, the control part 39 turns on the relays 36a, 36d in pairs only, on the basis of the master signal supplied from the PLC part 31. Consequently, since the branch line 32 is electrically connected to the ground line 5, the direct-current electricity flows from one end of the coil 371 to the other end, so that the motor 37 begins to rotate in the forward direction. It is noted that at this moment, the communication signal flows in the branch line 32 also. Nevertheless, as an impedance of the parallel resonant circuit 6 is established to have a maximum value at the frequency of the communication signal, a reduction of the magnitude of the communication signal due to the branch line 32 is minimized. Namely, despite of flowing of the communication signal in the branch line 32, there is no possibility that the accuracy of communication is damaged.

The control part 39 produces a slave signal informing that the motor 37 has begun to rotate in the forward direction and outputs the slave signal to the PLC part 31. Receiving the slave signal provided from the control part 39, the PLC part 31 converts the slave signal to a communication signal by ASK modulation and further outputs the communication signal to the power line 4.

In the master station 2, the PLC part 22 receives the above communication signal supplied from the slave station 3 through the power line 4 and converts the communication signal to a slave signal by ASK demodulation. Then, the PLC part 22 further outputs the slave signal to the control part 21. The control part 21 recognizes that the motor 37 has begun to rotate in the forward direction, based on the content of the slave signal.

As mentioned above, according to the embodiment, it is possible to ensure the impedance from the branch lines 32 33 up to the circuit power part 35 and the motor 37 since the parallel resonant circuit 6 and the impedance element 34 are together connected to the branch line 32. Additionally, the impedance element 34 is connected to only the branch line 33, while the motor 37 is connected to only the branch line 32. Thus, in the direct-current electricity flowing in the power line 4, only direct-current electricity (portion) to be supplied to the circuit power part 35 flows in the impedance element 34. It means that the impedance element 34 has only to cope with small current. Therefore, it is possible to miniaturize the impedance element 34, whereby the load control system 1 can be small sized to reduce both weight and manufacturing cost of the system 1 in comparison with the conventional system. Additionally, as the motor 37 is mounted on the vehicle in the embodiment, the above-mentioned effects could be realized in various fields related to a vehicle. For instance, in the vehicle, it is possible to reduce an installation space for the load control system 1.

Finally, it will be understood by those skilled in the art that the foregoing descriptions are nothing but one embodiment of the disclosed load control system and apparatus and therefore, various changes and modifications may be made without any departure from the present purpose of the invention. For instance, the motor 37 of the shown embodiment may be replaced by another load, for example, light. As for the slave station 3, a circuit part including the control part 39 may be separated from the motor 37. Additionally, the control part 39 may be constructed so as to control loads besides the motor 37.

What is claimed is:

1. A load control apparatus connected to a master station through a power line supplied with direct-current power and driven by the direct-current power supplied from the power line to communicate with the master station through the power line, the load control apparatus comprising:

a communication part connected to the power line to communicate with the master station with use of a communication signal having predetermined frequency;

first and second branch lines connected to the power line;

an impedance element connected to only the second branch line;

a load connected to only the first branch line and driven by the direct-current power supplied through the first branch line;

a capacitance element connected in parallel with the load, the capacitance element having a capacitance resonating with an inductance component of the load and the frequency of the communication signal;

a control part configured to perform a variety of processes, based on the communication signal received by the communication part communicating with the master station; and a circuit power part connected to the second branch line through the impedance element and configured to produce desired power from the direct-current power supplied through the second branch line and configured to supply the communication part and the control part with the desired power.

2. The load control apparatus as claimed in claim 1, further comprising a switching unit interposed in the first branch line to control power supply to the load, wherein an operation of the switching element is controlled by the control part.

3. The load control apparatus as claimed in claim 2, wherein the switching unit comprises a plurality of relays.

4. The load control apparatus as claimed in claim 1, wherein the load is mounted on a vehicle.

5. The load control apparatus as claimed in claim 4, wherein the load comprises a motor, while the capacitance element comprises a condenser.

6. A load control system having a master station and a slave station connected to the master station through a power line to which direct-current power is supplied, the master station and the slave station being driven by the direct-current power supplied through the power line and communicating with each other through the power line, wherein the slave station comprising:

a communication part connected to the power line to communicate with the master station with use of a communication signal having predetermined frequency;

first and second branch lines connected to the power line;

an impedance element connected to only the second branch line;

a load connected to only the first branch line and driven by part of the direct-current power supplied through the first branch line;

a capacitance element connected in parallel with the load, the capacitance element having a capacitance resonating with an inductance component of the load and the frequency of the communication signal;

a control part configured to perform a variety of processes, based on the communication signal received by the communication part communicating with the master station; and a circuit power part connected to the second branch line through the impedance element and configured to produce desired power from the direct-current power supplied through the second branch line and configured to supply the communication part and the control part with the desired power.

7. The load control system as claimed in claim 6, further comprising a switching unit interposed in the first branch line to control power supply to the load, wherein an operation of the switching element is controlled by the control part.

8. The load control system as claimed in claim 7, wherein the switching unit comprises a plurality of relays.

9. The load control system as claimed in claim 6, wherein the load is mounted on a vehicle.

10. The load control system as claimed in claim 9, wherein the load comprises a motor, while the capacitance element comprises a condenser.

* * * * *